UNITED STATES PATENT OFFICE.

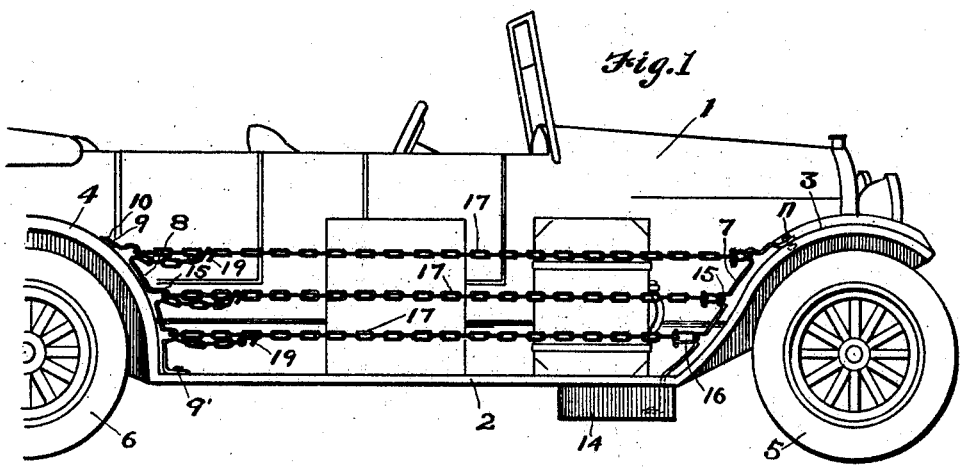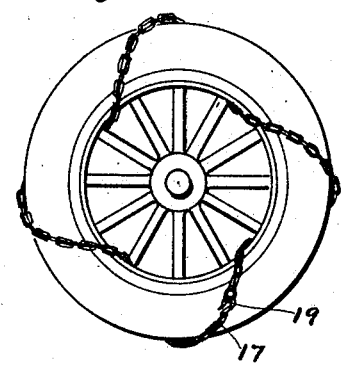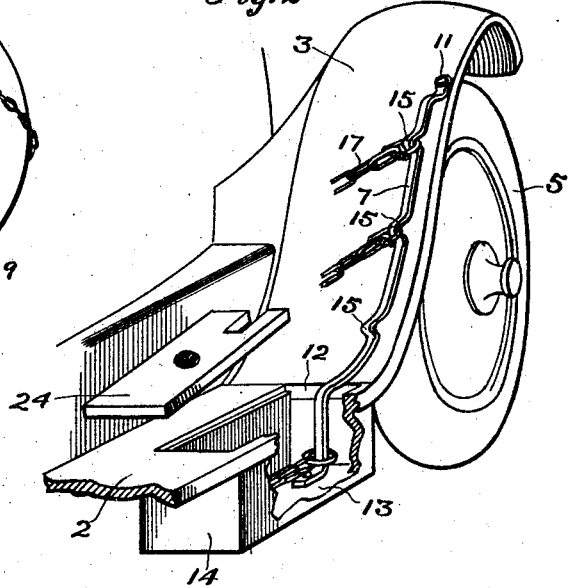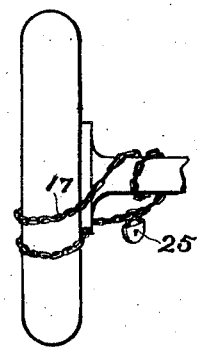

THOMAS L. FAY, OF SEATTLE, WASHINGTON.

ATTACHMENT FOR AUTOMOBILE RUNNING-BOARDS.

1,395,226.  Specification of Letters Patent.  Patented Oct. 25, 1921.

Application filed September 13, 1920. Serial No. 409,773.

*To all whom it may concern:*

Be it known that I, THOMAS L. FAY, a citizen of the United States, and resident of Seattle, King county, Washington, have invented certain new and useful Improvements in Attachments for Automobile Running-Boards, of which the following is a specification.

This invention relates to improvements in luggage carrying attachments for automobiles, and more particularly to devices of that character whereby boxes, packages, suitcases and the like may be held on the running board of an automobile for transportation.

The principal object of the present invention is to provide a luggage supporting device that can be made at a relatively small expense, which will be serviceable and efficient in use and which may be easily and quickly placed in, or removed from, carrying position on any of the ordinary types of automobiles.

Another object of the invention is to provide a device of this character which comprises a plurality of baggage supporting chains or cables, which may be utilized in a number of ways when occasion arises: For instance, they may be coupled together and used as a towing cable, or may be wound about a vehicle wheel to function as an anti-skid device, and also may be used as locking means for securing a wheel to prevent use of the vehicle by unauthorized persons.

Other objects of the invention reside in the novel construction of the members whereby the luggage supporting chains are mounted on the vehicle, in the housing for the chains when not in use, and in the manner whereby the chains may be placed within and removed from their housing.

In accomplishing these and other objects of the invention, I have provided the improved details of construction, the preferred forms of which are illustrated in the accompanying drawings, wherein—

Figure 1 is a side view of an automobile equipped with a baggage carrying device constructed and mounted according to the present invention.

Fig. 2 is an enlarged, detail view, partly in section illustrating the chain carrying housing and chain rod extended thereinto.

Fig. 3 illustrates the use of a chain as an anti-skid device.

Fig. 4 shows the chain used as a locking device.

Referring more in detail to the several views of the drawings, wherein like reference numerals designate like parts, 1 designates an automobile, which may be of any of the ordinary types, which is equipped with the usual running board 2, and mud guards 3 and 4 which extend over the front and rear vehicle wheels 5 and 6 respectively.

Fixed to the mud guards 3 and 4 adjacent to and parallel with their outer edges are chain securing bars 7 and 8; the bar 8 has a foot 9 at its upper end secured by bolts 10 to the mud guard, and at its lower end has a foot 9' which is likewise secured to the running board 2. The bar 7 is fixed at its upper end to the forward mud guard by a bolt 11, but at its lower end extends through an opening 12 in the running board and is fixed to the floor, or bottom 13, of a box 14 secured beneath the running board and opening to serve as a housing wherein the chains may be carried when not in use.

The bars 7 and 8 are so held by their mounting feet that they will be held spaced a distance that is approximately one-half inch from the mud guards and at intervals are bent outwardly to form loops, or sockets 15.

Slidable along the rod 7 are the end links or clevises 16 of baggage supporting chains 17. These clevises are adapted when the chains are in use to be seated in the rod sockets 15 as shown in Fig. 1, to hold the chains at certain spaced intervals, and the opposite ends of the chains are adapted to be extended about the rod 8 and seated in loops or sockets therein located in positions corresponding to sockets in the rod 7. At their ends opposite the ends equipped with the clevises, the chains have anchor hooks 19 which may be hooked after the chains have been passed around the rod 8 into any link of the chain that will provide proper adjustment and hold the chains taut.

When the chains are being used to carry baggage on the running board of the vehicle, they are adjusted to the proper positions along the rod and held at spaced distances by seating the clevises 16 in the sockets 15. Their opposite ends are then extended through the sockets of the rod 8 and drawn taut and secured by their end hooks.

When not in use, the chains are released from the rod 8, the clevises are removed from the sockets 15 in the rod 7 and are moved down the rod and into the box 14. A cover 24 is provided for the box which is normally closed.

It is apparent that cables could be used instead of chains, but I have shown chains, as they afford easier application of the hooks' ends thereto and permit readier adjustment.

These chains have various uses when not being used as baggage supports. For instance, they can be removed from the rod 8 by removing the clevis bolts and can be connected by their end hooks to form a towing chain.

Another use is illustrated in Fig. 3 which shows a chain used as an anti-skid device. In this instance the chain is wound about the wheel and its ends secured together by means of its end hook which is extended through the opposite end ring.

Fig. 4 shows the use of a chain as a locking device for the vehicle. Here the chain has been wound about a wheel and axle of the vehicle and its ends secured together by use of a pad lock 25.

It is apparent that such a construction could be easily placed on any vehicle. It would be very serviceable, and the chains utilized in a number of ways as has been illustrated.

It is also apparent that changes in construction could be made without departing from the spirit of the invention, such as placing hooks at either end of the chains, or securing the chains to the bars 7 or 8, and I therefore do not wish to be limited only to the constructions shown.

Having thus described my invention, what I claim as new therein and desire to secure by Letters Patent is:

1. In a baggage carrying attachment for automobiles, the combination with a running board and forward and rearward mud guards continuing therefrom, of bars secured to extend along the outer edges of said mud guards having sockets at spaced intervals therein, a plurality of chains having ends equipped with rings that are slidable along one of said bars and adapted to be seated in said sockets, and having opposite end portions extendible about the other bar and adapted to be seated in its sockets to hold the chains at adjustably spaced distances, and hooks at the free ends engageable with links of the chains to secure these ends about the latter bar for the purpose set forth.

2. A baggage carrying attachment for automobiles, comprising in combination with a running board and wheel mud guards continuing from its opposite end, a bar secured to extend along the outer edge of each of said mud guards and at a slight distance therefrom, said bars having sockets formed therein at corresponding intervals, a housing secured to the running board which receives the lower end of one of said bars, a plurality of baggage securing chains having ends equipped with rings which are slidable along the bar that extends into said housing and adapted to be seated in said bar sockets to hold these ends of the chains at spaced distances apart, and having opposite free ends extendible about and adapted to be seated in the sockets of the opposite bar and equipped with hooks whereby said free ends may be secured about the latter bar; all of said chains being adapted when released at their hook ends to be slid downward on the first bar and into said housing at the lower end thereof.

3. A baggage carrying attachment for automobiles, comprising in combination with a running board having an opening therein at one end and mud guards continuing from the opposite ends of said board, of a chain housing secured to said running board beneath said opening, a bar secured to extend along the outer edge of each of said mud guards, and spaced slightly therefrom; said bars having sockets formed therein at corresponding intervals and the lower end of one of said bars being extended through said board opening and secured within said housing, a plurality of baggage securing chains having ends equipped with rings which are slidable along the bar that extends into said housing and adapted to be seated in said bar sockets to hold these ends of the chains at spaced distances apart, and having opposite free ends extendible about and adapted to be seated in the sockets of the opposite bar and equipped with hooks whereby said free ends may be secured about the latter bar; all of said chains being adapted when released at their hook ends to be slid downward on the first bar and into said housing at the lower end thereof.

Signed at Seattle, Washington, this 31st day of August, 1920.

THOMAS L. FAY.